United States Patent [19]

McKee

[11] Patent Number: 5,085,153
[45] Date of Patent: Feb. 4, 1992

[54] DESK STRUCTURE

[76] Inventor: Carl B. McKee, 29971 Homeland Ave., New Hudson, Mich. 48165

[21] Appl. No.: 533,803

[22] Filed: Jun. 6, 1990

[51] Int. Cl.$^5$ ............................................. A47B 23/00
[52] U.S. Cl. .......................................... 108/44; 108/25
[58] Field of Search ................. 108/44, 46; 312/235.8, 312/237, 293; 297/135, 160, 194

[56] References Cited

U.S. PATENT DOCUMENTS

| 2,934,391 | 4/1960 | Bohnett | 312/293 |
| 4,577,788 | 3/1986 | Richardson | 108/44 |
| 4,795,210 | 1/1989 | Milat | 297/194 |

Primary Examiner—Kenneth J. Dorner
Assistant Examiner—Gerald A. Anderson
Attorney, Agent, or Firm—Bertram F. Claeboe

[57] ABSTRACT

A desk structure is provided which is readily adaptable for removable positioning within a vehicle interior, preferably upon the front arm rest thereof. The desk structure disclosed includes a supporting base framework which may be sized for seating upon a variety of arm rest configurations, and mounted upon the base framework is a table top member having conveniently disposed cavities formed therein imparting to the desk structure multifunctionality while the vehicle is in motion and also at rest. Illustratively, the cavities may receive a writing pad, writing implements, miscellaneous loose items, and electronic equipment exemplified by a mobile telephone on a dictation machine. Objects within the cavities are readily accessible to the driver without distraction from normal vehicle operation.

1 Claim, 2 Drawing Sheets

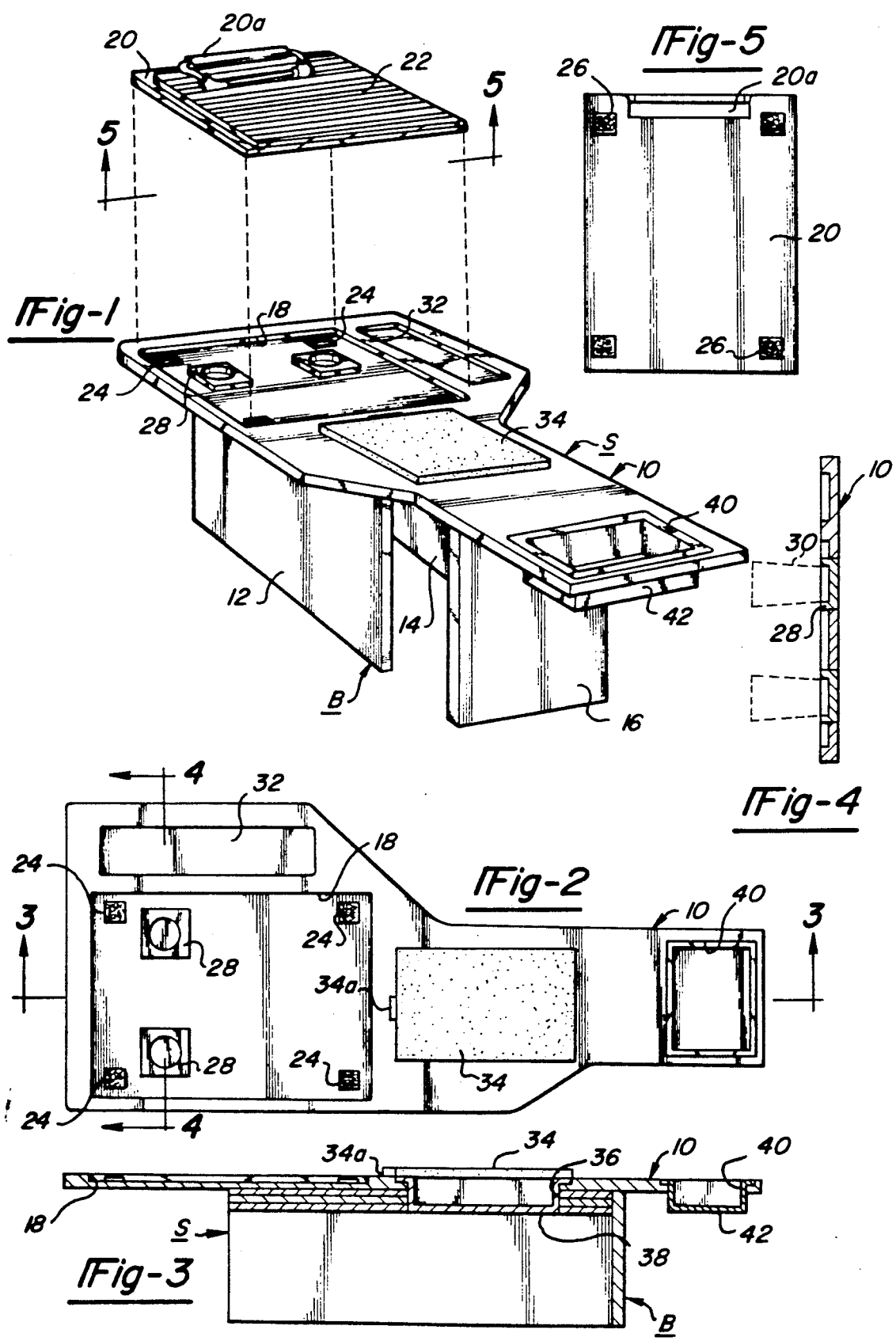

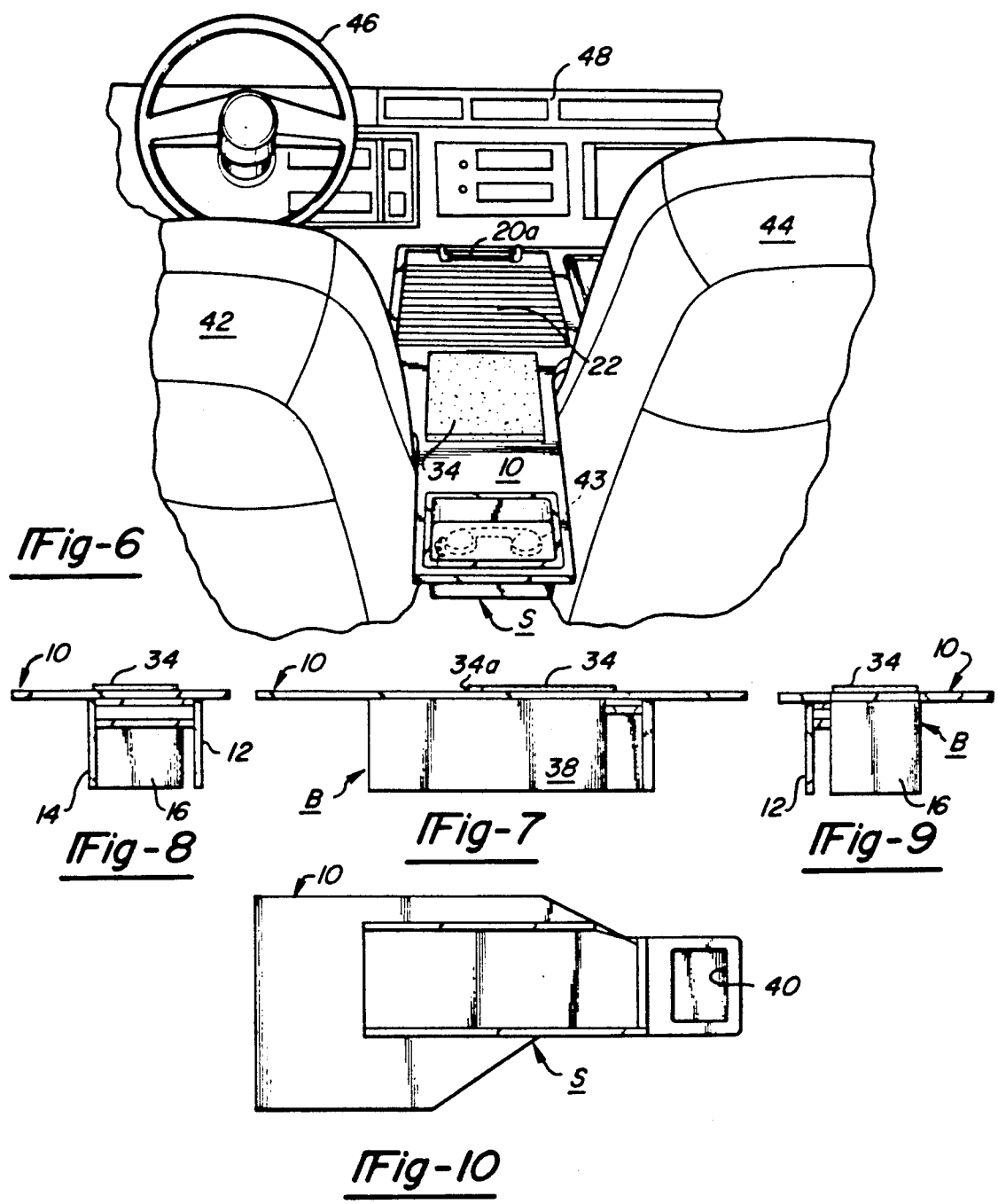

DESK STRUCTURE

BACKGROUND OF THE INVENTION

It is known in the art to which this invention pertains that upon occasion while a motor vehicle is in motion upon a roadway, the driver thereof finds it desirable or necessary to make written notes, or to obtain ready access to such objects as a pack of chewing gum or cigarettes, a cup of liquid, or a cellular telephone, by way of illustration. Prior art attempts at meeting this need have generally been directed toward desk containers mounted upon the dashboard of the vehicle, upon the front seat thereof, or straddling the tunnel hump in the vehicle front section.

Each of these prior art expedients has inherent disadvantages. In the case of the dashboard mounted desk container, a semi-permanent connection to the dashboard is made, destroying the aspect of true portability. In addition, the dashboard is thereby permanently defaced. Further, with this structure in place, neither the writing surface nor the storage pockets can be considered truly accessible to the driver, particularly when the vehicle is in motion. Lack of ease of accessibility, especially for writing purposes, also characterize the front seat and tunnel mounted prior art desk structures, among other inherent disadvantages.

SUMMARY OF THE INVENTION

Applicant has provided a new and improved desk structure constructed to be removably seated in the console area, preferably upon the movable or tiltable arm rest between the driver and passenger seats, and readily adaptable to a variety of makes and types of vehicles. The desk structure of this invention comprises a generally box-like base framework sized to be seated upon a vehicle arm rest in removable snug fitting relation therewith, the base framework fixedly mounting thereon a substantially flat top member removably supporting a writing tablet, preferably maintained in position by a clip board. Positioned upon the table top member in adjacency to the writing tablet is a relatively flat removably mounted arm cushioning member, and if desired, in this location the top member may have an opening formed therein for receiving a relatively shallow vessel useful for the storage of such miscellaneous items as gasoline receipts, credit cards, and the like.

The table top member of applicant's novel desk structure may have additional openings formed therein, contributing significantly to the multifunctionality of the structure. A generally elongated opening in close proximity to the writing tablet location may receive a vessel for the reception of pens, pencils, and the like, while generally rearwardly of the arm cushioning member an opening in the top member may be provided for receiving a vessel convenient for the storage of a mobile phone or like object.

Spillage of liquid from cups during vehicle motion is a vexatious problem, and one solution thereof by this invention is the provision in the desk structure top member in the region supporting the writing tablet of a plurality of openings mounting relatively shallow cup-supporting vessels. It should be noted that in this manner dual functionality is achieved from limited space.

BRIEF DESCRIPTION OF THE DRAWINGS

FIG. 1 is a perspective view of the desk structure of this invention, and showing by phantom lines the writing tablet in uplifted position;

FIG. 2 is a top plan of applicant's structure;

FIG. 3 is a vertical sectional view taken substantially along the line 3—3 of FIG. 2;

FIG. 4 is a vertical sectional view taken substantially along the line 4—4 of FIG. 2;

FIG. 5 is a plan view looking at the bottom of the writing pad support means;

FIG. 6 is a perspective view of a typical automobile front interior and showing the present invention positioned therein;

FIG. 7 is a side view of applicant's desk structure;

FIG. 8 is a front end view thereof;

FIG. 9 is a rear end view of the present invention; and

FIG. 10 a bottom view thereof.

DESCRIPTION OF A PREFERRED EMBODIMENT

Referring now to the drawings, and first more particularly to FIG. 1 thereof, a desk structure embodying the novel concepts of the present invention is designated in its entirety by the legend S. As shown therein, desk structure S comprises a supporting base framework generally designated by the legend B fixedly mounting thereon a table top member 10. The supporting base B is preferably provided by spaced vertically disposed side members 12 and 14, and an upright end member 16. The opposite or front end of the supporting base B is desirably open-ended for ease of installation of the desk structure S in the environment shown in FIG. 6, to which more specific reference will later be made. Various materials may provide the supporting base framework B and table top member 10, and by way of illustration there may be employed plywood, pressed wood, rigid plastics, and the like appropriately colored or finished for aesthetic reasons.

The table top member 10 of the desk structure S of this invention is multi-functional, and additional reference is now made to FIGS. 2, 3, 4 and 5 of the application drawings. In the front or forward area of the desk structure S, the table top member 10 is constructed to include a generally rectangular recess or cavity 18 for removably receiving a writing tablet support board 20, which may be of the clip board type shown and thus provided with clip means 20a for engagement with writing tablet 22. Releasable attachment of the writing tablet support board 20 within cavity 18 of table top member 10 may be effected in various ways, and one exemplary means is the use of one composite element of a cooperative pair of elements identified in the trade by the "Velcro" trademark. The cooperative pair of elements is provided by pile and hook material constructed in a manner well-known in the art, and also referred to as hook tape. As employed herein, table top member 10 in the cavity 18 mounts hook tape pads or elements 24 cooperatively engaging hook tape pads on elements 26 on the underside of writing tablet support board 20. Of course, the pads or elements 24 and 26 may be provided in ribbon or strip form.

In addition to providing a study and readily accessible writing surface, both while the vehicle is in motion and at rest, the desk structure S of this invention has significant utility as a repository for beverage cups. For this purpose, and in the area normally occupied by the writing tablet support board 20, there may be fixedly mounted coasters 28. These may be of the type shown in my U.S. Pat. No. 4,829,618 entitled "Coaster/Opener for Beverage Containers". In the alternative, holes or openings may be provided in the table top member 10 in this location for the reception of beverage cups, shown at 30 by phantom lines in FIG. 4, and if desired, within such holes or openings there may be seated vessels to receive beverage cups and thereby provide further support for the cups.

Applicant's desk structure S, and more particularly the table top member 10 thereof, also provides ease of access to and convenient storage for miscellaneous items such as pens, pencils, chewing gum, cigarettes and the like. For this purpose, the tablet top member 10 in adjacency to the writing table receiving cavity 18 may be formed to include an elongated storage cavity 32, or in the alternative, an elongated hole or opening may be provided in the table top member 10 to receive a tray or vessel for receiving the miscellaneous items mentioned.

The desk structure S as shown in FIGS. 1 and 6 is constructed to provide optimum comfort to the driver while writing on the letter pad 22 in its down position. The driver's forearm is adequately supported by the table top member 10, in contrast to the prior art desk structure mounted upon the dashboard. However, by the present invention additional means are provided to steady the driver's forearm and hand, while additionally cushioning the forearm. Such means desirably takes the form of pad member 34, which may be provided by a generally rectangular piece of rigid styrofoam or plywood covered by a layer of Velcro material. The pad member 34 reduces slippage of the driver's arm, particularly when writing while the vehicle is in motion, and additionally, functions as a cover for a storage compartment located therebeneath. With reference now to FIGS. 3 and 7, table top member 10 is formed with a generally rectangular hole or opening 36 therein rearwardly spaced from the writing tablet board member cavity 18. Mounted within the opening 36 is a relatively shallow vessel or pan 38, providing convenient storage for such miscellaneous items as credit cards, gasoline receipts and the like. Tab 34a on the pad member 34 may be provided to facilitate access to the vessel 38 when desired.

Cellular telephones are finding increased utility in road vehicles exemplified by automobiles, trucks, motor homes, buses and the like. The desk structure S of this invention, and more particularly the table top member 10 thereof, is so constructed as to provide ready accessibility to this type of equipment, as well as a portable dictation machine. For this purpose, table top member 10 in the rear end portion thereof is shaped to include a generally rectangular hole or opening 40 therein for supporting a vessel or pan 42 housing mobile telephone 40 (FIG. 6). In the alternative, the table top member 10 during the forming process may have a pocket or cavity shaped integral therewith to receive a cellular telephone as a fixed or semi-fixed component of the desk structure S.

As was stated hereinabove, the desk structure S is so constructed and arranged as to be snugly seated upon the arm rest between the driver and passenger seats of an automobile or other vehicle. Referring now particularly to FIG. 6, which shows a typical automobile front section interior, driver's seat 42 and passenger's seat 44 are of the bucket seat type between which is either a console or arm rest, generally of the swingable or tiltable type. For ease of illustration of the invention, FIG. 6 only portrays steering wheel 46 and dashboard 48 of the vehicle.

The supporting base framework B of the desk structure S through provision of the vertically disposed side members 12 and 14 and end member 16 make frictional engagement with the side walls and end wall of the arm rest (not shown). If desired, straps may be provided on the desk structure S to effect even more firm securement to arm rest or console, as the case may be. As is now apparent, if applicant's desk structure is mounted upon a movable or tiltable arm rest, it may be swing upwardly and rearwardly therewith to an inactive position. As is also believed now apparent, the desk structure of this invention is readily adaptable to different makes of vehicles and other classes of both the land air, and sea type by varying the dimensioning of the supporting base framework. Additionally, applicant's desk structure S may be supported upon the arm of a chair or sofa at home, and readily transferred to a vehicle environment.

The advantageous features of the present invention over the prior art were noted hereinabove, as well as various changes which can be effected in the preferred embodiment shown and described herein. These and other modifications may of course be practical, without departing from the spirit of the invention on the scope of the subjoined claims.

I claim:

1. A desk structure to be removably positioned upon an arm rest located between a pair of seats disposed in side by side relation in a driver-operated vehicle, said arm rest including top, rear and side walls, said desk structure comprising a substantially rectangular three-sided box-like supporting framework enclosing said arm rest in the close-fitting contact with the top, rear and side walls of said arm rest, the vertical dimension of said framework being uniform around its three sides for contact with said pair of vehicular seats, and a table top member of relatively greater width at one end than at the opposite end rigidly secured to said supporting framework in overlying relation to said framework, said table top member at said opposite end being provided with a first cavity to receive a mobile telephone or other communication apparatus, a second cavity in said one end of said table top member is provided for a removable writing tablet, and a third cavity is provided between said second cavity and said first cavity having a cushioning cover means for resting a vehicle passenger's forearm.

* * * * *